United States Patent
Simonsson et al.

(10) Patent No.: US 8,923,136 B2
(45) Date of Patent: Dec. 30, 2014

(54) METHOD AND APPARATUS IN A TELECOMMUNICATIONS NETWORK FOR CONTROLLING UPLINK CONTROL CHANNEL

(75) Inventors: Arne Simonsson, Gammelstad (SE); Per Burström, Luleå (SE); Peter Moberg, Stockholm (SE); Jessica Östergaard, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 248 days.

(21) Appl. No.: 13/139,382

(22) PCT Filed: Dec. 15, 2008

(86) PCT No.: PCT/SE2008/051453
§ 371 (c)(1),
(2), (4) Date: Jun. 13, 2011

(87) PCT Pub. No.: WO2010/071500
PCT Pub. Date: Jun. 24, 2010

(65) Prior Publication Data
US 2011/0242990 A1   Oct. 6, 2011

(51) Int. Cl.
*H04W 72/08* (2009.01)

(52) U.S. Cl.
CPC .................. *H04W 72/085* (2013.01)
USPC .......................................... 370/242; 370/330

(58) Field of Classification Search
None
See application file for complete search history.

(56) References Cited

U.S. PATENT DOCUMENTS

| 2002/0080719 | A1  | 6/2002 | Parkvall et al. | |
|---|---|---|---|---|
| 2002/0085502 | A1* | 7/2002 | Chheda et al. | 370/252 |
| 2006/0223445 | A1* | 10/2006 | Baker et al. | 455/69 |
| 2010/0034165 | A1* | 2/2010 | Han et al. | 370/330 |

FOREIGN PATENT DOCUMENTS

| EP | 1956771 A2 | 8/2008 |
|---|---|---|
| WO | 97/13388 | 4/1997 |
| WO | 2008/155370 A2 | 12/2008 |

OTHER PUBLICATIONS

3rd Generation Partnership Project. "L1/L2 Control Channel Structure for E-UTRA Uplink." 3GPP TSG RAN WG1 Meeting #45, R1-061183, Shanghai, China, May 8-12, 2006.
3rd Generation Partnership Project. "Uplink Transmission of CQI and ACK/NACK." 3GPP TSG RAN1#51, R1-074594, Jeju, Korea, Nov. 5-9, 2007.

* cited by examiner

*Primary Examiner* — Jianye Wu
(74) *Attorney, Agent, or Firm* — Coats & Bennett, PLLC

(57) ABSTRACT

The present invention provides a method and a radio base station (4) which actively monitor the error rate for messages transmitted over an uplink control channel between the radio base station (4) and one or more mobile terminals (6). The distribution of messages transmitted on the uplink control channel is then adapted in dependence on the measured error rate.

24 Claims, 3 Drawing Sheets

METHOD AND APPARATUS IN A TELECOMMUNICATIONS NETWORK FOR CONTROLLING UPLINK CONTROL CHANNEL

The present invention relates to telecommunications networks, and more particularly relates to a method and an apparatus for controlling resource utilization for uplink communications in a telecommunications network.

BACKGROUND

FIG. 1 shows part of a telecommunications network 2. The network 2 comprises a radio base station 4, which transmits signals to a mobile terminal 6 in downlink communications 8a, and receives signals transmitted by the mobile terminal 6 in uplink communications 8b. The radio base station 4 further communicates with a core network 8.

Those skilled in the art will appreciate that numerous devices and features have been omitted from the description of the network 2 for the purposes of clarity. For example, the network 2 will in general comprise a plurality of radio base stations, with each radio base station transmitting to a plurality of mobile terminals. Further, the core network 8 in general comprises a multitude of different devices, which act to control the operation of the network 2, and to pass data, etc from one part of the network to another.

Both downlink communications 8a and uplink communications 8b are transmitted over a number of different channels, generally including data channels, for transmitting data, and control channels, for transmitting control signals. That is, the downlink communications 8a take place over at least a downlink data channel and a downlink control channel, and the uplink communications 8b take place over at least an uplink data channel and an uplink control channel. For example, UMTS terrestrial radio access (UTRA) according to Release 8 of the 3GPP specifications—also known as evolved UTRA (E-UTRA) or long term evolution (LTE)—defines the physical downlink shared channel (PDSCH) and the physical downlink control channel (PDCCH), and corresponding uplink channels PUSCH and PUCCH.

The resources for transmitting the various channels are divided into so-called "resource blocks", which each define a portion of frequency and time. That is, the channels are time-division multiplexed (TDM) and frequency-division multiplexed (FDM). In addition to this, to enable an even greater use of resources, a number of users may be multiplexed on a single resource block by means of code-division multiplexing (CDM).

The uplink data channel (e.g. PUSCH) is shared between a number of different users to enable an efficient use of resources. In order to transmit data over a shared channel, a user must request and be granted an allocation of resources on that channel. Such scheduling requests are sent over the uplink control channel, e.g. PUCCH, if resources for scheduling requests have been configured. Scheduling requests are initiated by a buffer status report (BSR) trigger in the mobile terminal. This happens when some higher-layer mechanism determines that data needs to be delivered. The scheduling requests are transmitted within a defined periodic time slot, with the periodicity of scheduling requests being semi-statically configured by radio resource control (RRC) and ranging from 5 to 80 ms. A mobile terminal does not necessarily have scheduling-request resources (there is also an "off" option) in which case it requests uplink grants by a transmission on the Random Access Channel.

When resources have been assigned on the downlink data channel, e.g. PDSCH, data is transmitted by the radio base station 4 to the mobile terminal 6. Many telecommunications networks employ automatic repeat request (ARQ) or hybrid automatic repeat request (HARQ) schemes, where received data is acknowledged by the receiving party. Thus, where the data was received by the mobile terminal 6, acknowledgement messages are sent over the uplink control channel, e.g. PUCCH. If the data is correctly received, a positive acknowledgement (ACK) is sent; if the data is incorrectly received, a negative acknowledgement (NACK) is sent (or alternatively no acknowledgement message is sent).

When employing multiple-input, multiple-output (MIMO) communications between the mobile terminal 6 and the radio base station 4, more than one data stream may be sent to a single mobile terminal. In this case, individual HARQ processes may be used for each data stream by sending different code words for each stream and acknowledging them (i.e. sending an ACK/NACK) individually.

It is also necessary to obtain knowledge about the current state of the interface between the radio base station 4 and the mobile terminal 6. This is important for the purposes of, amongst other things, link adaptation, precoding in multi-input multi-output (MIMO) transmissions, and transmission power control (TPC). The mobile terminal 6 therefore periodically sends channel quality indicators (CQIs) to the radio base station 4 over the uplink control channel, e.g. PUCCH. The periodicity is configured, as with scheduling requests, by higher layers, and ranges from 2 to 256 ms (or alternatively may be completely "off"). The CQIs may include, for example, the signal strength; the delay spread; the path loss; the Doppler spread; the frequency error; the noise strength; the interference strength; and the signal to interference and noise ratio (SINR).

Thus various messages are transmitted over the uplink control channel, including scheduling requests, ACK/NACKs, and CQIs.

A problem arises when the radio base station 4 has to transmit to, and receive transmissions from, many mobile terminals at the same time. As described above, a combination of TDM, FDM and CDM is used to spread the uplink control channel resources according to the various users' requirements. However, a balance must be struck. Too aggressive an allocation of resources (i.e. such that many mobile terminals transmit simultaneously on the same frequency resource) creates a high risk of an unacceptable error probability for ACKs/NACKs, CQIs and scheduling requests. This in turn decreases the system and/or user throughput (for example, because of the necessity of retransmitting signals which were incorrectly received), and degrades the overall system performance. Conversely, too cautious an allocation of resources (i.e. with relatively few mobile terminals transmitting simultaneously on the same frequency resource) creates a risk of poor resource utilization. Greater resources may then need to be allocated to the uplink control channel itself, thereby decreasing the allocation to data channels and reducing data throughput.

SUMMARY

The embodiments of the present invention overcome the problems described above by actively monitoring the error rate of messages transmitted over the uplink control channel. The measured error rate is then used to adapt the distribution of the messages transmitted over the uplink control channel. For example, in one embodiment the error rate is compared with one or more thresholds; if the threshold is exceeded, the distribution is adapted such that the error rate is decreased (for example by preferring time-division multiplexing over other multiplexing schemes). In one embodiment, if the error rate is below the threshold, the distribution is adapted such that the error rate is increased (i.e. such that resources are more fully utilized).

Different methods may be applied according to the type of messages transmitted over the uplink control channel: scheduling requests, channel quality indicators, or ACK/NACK messages.

Thus, according to an embodiment of the present invention there is provided a method of controlling resource utilization in a telecommunications network, the telecommunications network comprising a plurality of mobile terminals and at least one radio base station. The mobile terminals are configured to transmit messages to the radio base station over an uplink control channel, and resources for the uplink control channel comprise a plurality of resource blocks, each resource block corresponding to a period of time and a frequency bandwidth. The method comprises measuring an error rate of messages transmitted over the uplink control channel; and, on the basis of the measured error rate, adapting a distribution of messages over the plurality of resource blocks on the uplink control channel.

BRIEF DESCRIPTION OF THE DRAWINGS

For a better understanding of the present invention, and to show more clearly how it made be carried into effect, reference will now be made, by way of example, to the following drawings, in which.

DETAILED DESCRIPTION

Throughout this description various terms have been used to describe devices and features that will differ according to the particular standard, etc, according to which the telecommunications network is designed. For example, the term "radio base station" may refer to a NodeB, as utilized in UMTS terrestrial radio access (UTRA), or an eNodeB, as used in evolved UMTS terrestrial radio access (E-UTRA), etc. Likewise, the term "mobile terminal" includes references to user equipment, as utilized in UTRA and E-UTRA.

According to an embodiment of the present invention, the uplink control channel (e.g. the PUCCH) is monitored for errors. When the error rate becomes unacceptable (for example, when a threshold is exceeded), steps are taken to adapt the distribution of messages received over the uplink control channel. Such adaptation may include, for example, preferring time-division multiplexing over other multiplexing methods (frequency- and code-division multiplexing), such that fewer messages are received over the uplink control channel in a given transmission time interval (TTI).

Figure 1:
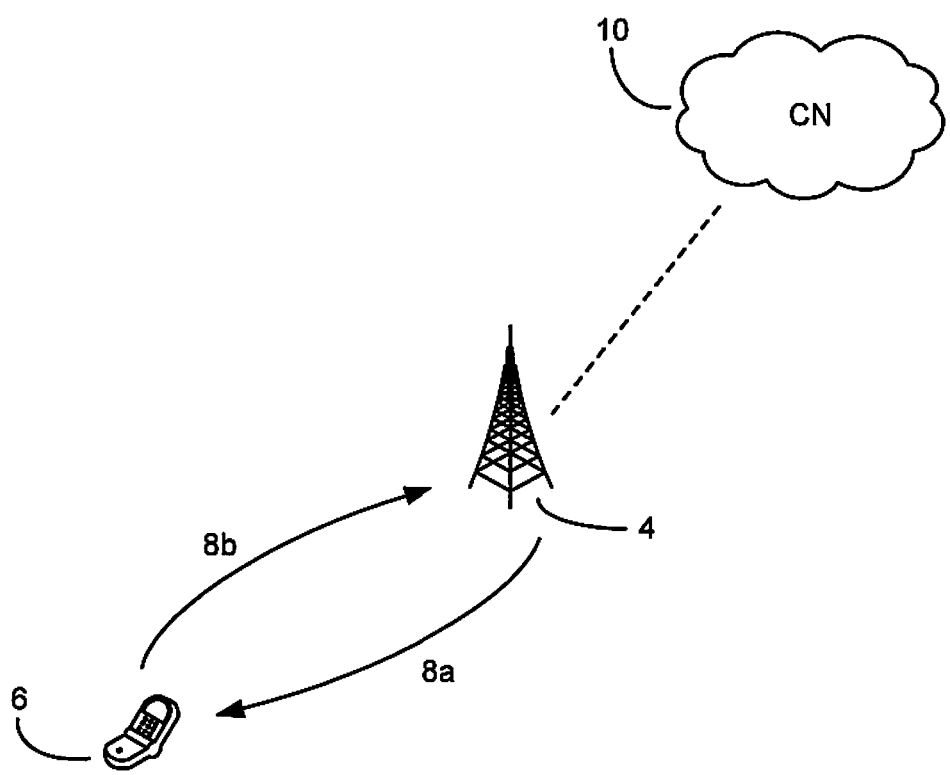
FIG. 1 shows a telecommunications network.
Figure 2:
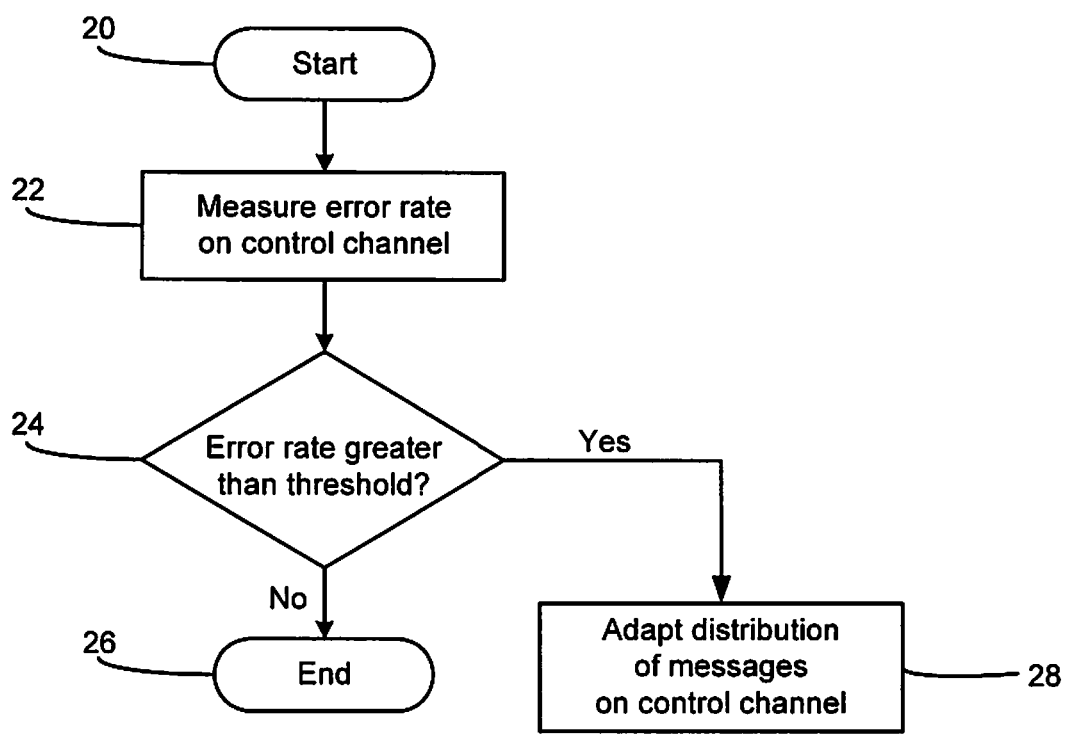
FIG. 2 is a flowchart illustrating a method according to an embodiment of the present invention.

FIG. 2 is a flowchart of a method according to an embodiment of the present invention, for use in a telecommunications network as described with respect to FIG. 1.

The method begins in step 20. In step 22, the radio base station 4 measures the error rate of messages received over the uplink control channel (e.g. the PUCCH). An aggregate error rate for all messages may be measured, or individual error rates measured for each type of message.

For example, the error rate for ACK/NACK messages may be estimated through the detection of retransmissions on the radio link control layer (RLC). ACK/NACK messages are transmitted, in one embodiment, as one symbol containing one or two bits, depending on the modulation scheme (binary phase shift keying or quadrature phase shift keying). The symbol is detected by a threshold that is set at the detector via probability functions. In this embodiment, the threshold may be set so that the error case of NACK to ACK or a DTX to ACK (i.e. a transmitted NACK message or DTX being detected as an ACK message) has a lower occurrence probability than the other errors of ACK to NACK, ACK to DTX, DTX to NACK and NACK to DTX. The latter errors mean only that a relatively fast (in some cases superfluous) retransmission of the packet takes place; the former errors imply a longer delay since data will be lost and the error case is detected by the slower RLC layer.

The error rate for CQI messages may be measured through the code applied to the CQI bits. That is, the bits of the CQI messages may be coded to make them more robust. In this case, the error rate of CQI messages may be measured by determining the difference between the detected CQI code word and the closest known CQI code word. For example, this may be achieved by counting the number of errors in the coded bits.

The error rate for scheduling requests may be estimated in a number of different ways. For example, the number of "false alarms" may be counted, i.e. the number of times a mobile terminal is allocated resources on the uplink data channel but does not use them. This may arise through corruption of the original scheduling request sent over the uplink control channel. The error rate may be estimated by measuring the energy level on the scheduling request transmission. For example, the scheduling request may be determined as a scheduling request by comparing the energy transmitted over the scheduling request resources with a threshold. If the energy exceeds the threshold, the transmission is determined as a scheduling request from a particular mobile terminal. If the energy is close to the threshold (i.e. just over, or just under the threshold), it may be an indication that an error was likely in the transmission. Thus, a possible measure of scheduling request reliability is how far above the noise floor the detected energy is. In another embodiment, the mobile terminal comprises a counter which is adapted to count failed scheduling requests (i.e. transmitted scheduling requests that have not resulted in allocated resources on the uplink data channel). After x failed requests (where x is a certain number of failed requests), the mobile terminal may switch to random access in order to get a grant on the uplink data channel. The radio base station may then use a received random access message as an indication that at least x errors have occurred in scheduling requests transmitted by that mobile terminal. In a further embodiment, the error rate may also be estimated by determining a delay estimate, looking at the transmitted data following the scheduling request. That is, the mobile terminal may continue to send scheduling requests until the radio base station grants resources on the uplink data channel. If the mobile terminal has to perform four scheduling request transmissions before it gets a grant, there will be a delay in the subsequent data transmission of three times the periodicity of the scheduling requests. If, however, the radio base station has correctly received the scheduling requests but decided not to grant resources for any other reason, it will know this and can disregard delays caused by such routes in order to determine an accurate scheduling request error rate.

In step 24, the error rate is compared with a threshold. Where the error rate is an individual error rate for a particular type of message (e.g. CQI, scheduling request, ACK/NACK etc), the threshold is similarly an individual threshold for that particular type of message. Where the error rate is an aggregate of one or more of the individual error rates on the uplink control channel, the threshold is similarly an aggregate of those one or more individual thresholds.

In one embodiment, if the error rate is below the threshold, no changes are made and the method ends at step 26 (except that it may be repeated in future). If the error rate exceeds the threshold, the method proceeds to step 28, where the distribution of messages over the uplink control channel is adapted. In one embodiment, the distribution is adapted such that fewer messages are sent to the radio base station 4 over the uplink control channel per transmission time interval (TTI), i.e. time-division multiplexing is preferred to other multiplexing techniques.

In one embodiment, if the aggregate error rate exceeds the aggregate threshold, or if the ACK/NACK error rate exceeds the ACK/NACK threshold, the distribution of ACK/NACK messages is adapted by altering the scheduling of downlink communications. For example, when scheduling resources on the downlink data channel (e.g. the PDSCH), larger bandwidths of frequency may be allocated to single mobile terminals, with consequently reduced numbers of mobile terminals being allocated to receive data in the same TTI. This in turn reduces the numbers of ACK/NACK messages received over the uplink control channel per TTI, acknowledging receipt (or not, as the case may be) of the data transmitted over the downlink data channel.

In another embodiment, MIMO communications are employed between the mobile terminal and the radio base station, with multiple individual data streams (code words) being transmitted simultaneously to the same mobile terminal, and individual ACK/NACK messages being sent for each data stream or a higher-order modulation symbol carrying several ACK/NACK messages being sent to ACK or NACK several data streams at once. In this embodiment, if the aggregate error rate exceeds the aggregate threshold, or if the ACK/NACK error rate exceeds the ACK/NACK threshold, the distribution of ACK/NACK messages is adapted by altering the number of individual data streams. For example, the number of data streams may be reduced in order to reduce the number of ACK/NACK messages sent over the uplink control channel.

In another embodiment, if the aggregate error rate exceeds the aggregate threshold, or if the CQI error rate exceeds the CQI threshold, the distribution of CQI messages is adapted by altering the frequency with which CQI messages are sent by the mobile terminal, that is, by increasing or decreasing the channel state reporting period. The channel state reporting period may be altered in the radio resource control layer, with the radio base station signalling the change to the mobile terminal.

In a further embodiment, if the aggregate error rate exceeds the aggregate threshold, or if the scheduling request error rate exceeds the scheduling request threshold, the distribution of scheduling requests is adapted by altering the frequency with which scheduling requests are allowed to be sent by the mobile terminal. The frequency may be altered in the radio resource control layer, with the radio base station signalling the change to the mobile terminal.

Thus, methods have been described for altering the distribution of CQI messages, scheduling requests, and ACK/NACK messages received over the uplink control channel. These methods may be performed separately, to reduce the error rate for the message type concerned, or in any combination to reduce the aggregate error rate.

It will be apparent to those skilled in the art that, in addition to adapting the distribution of messages if the error rate exceeds a threshold (i.e. decreasing the number of messages received over the uplink control channel per TTI), the distribution of messages may also be adapted if the error rate falls below the threshold. That is, if the error rate falls below the threshold, this may be an indication that resources are not being utilized efficiently. Thus, if the error rate falls below the threshold, in this embodiment the opposite of the steps described above may be performed to increase the number of messages received over the uplink control channel per TTI. For example, to increase the ACK/NACK error rate, downlink transmissions may be scheduled for an increased number of mobile terminals per TTI. To increase the CQI error rate or the scheduling request error rate, the frequency with which such transmissions are sent may be increased. In this embodiment, the threshold therefore acts as a "target" error rate, i.e. one which has been determined as an ideal compromise between acceptable probability of errors and efficient utilization of resources.

In a further embodiment, the distribution of messages received over the uplink control channel is adapted by increasing or decreasing the amount of resources allocated to the uplink control channel itself. For example, by increasing the band of frequencies allocated to the uplink control channel, the messages can be spread out over a larger number of resource blocks, resulting in fewer messages sent per resource block.

Figure 3:
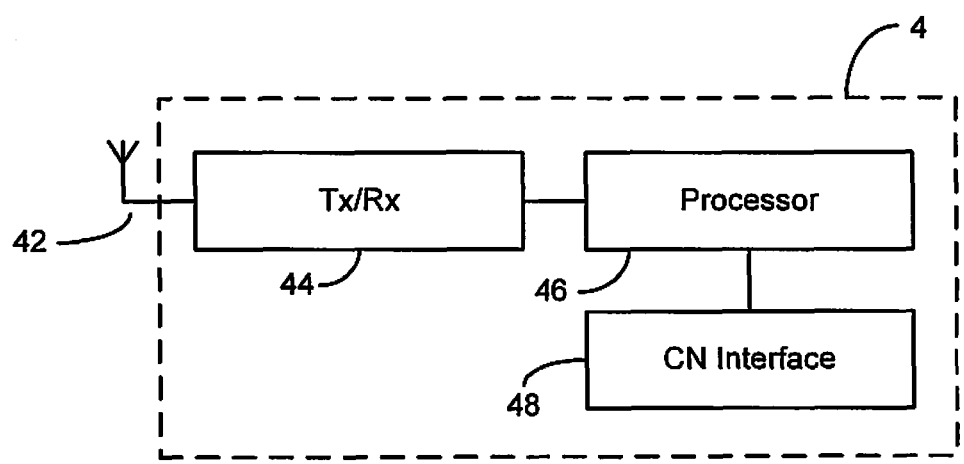
FIG. 3 shows a radio base station according to an embodiment of the present invention.

FIG. 3 illustrates a radio base station 4 according to an embodiment of the present invention.

The base station 4 comprises an antenna 42, coupled to transmitting and receiving circuitry 44. The Tx/Rx circuitry 44 is further coupled to processing circuitry 46. In addition, the radio base station 4 comprises interface circuitry 48 for interfacing with the core network.

It will be apparent to those skilled in the art that, where they are non-essential to describe the embodiments of the present invention, numerous features have been omitted for clarity. Further, it will also be apparent that the base station 4 may comprise more than one antenna, and more than one Tx/Rx circuitry, for example in order to utilize MIMO communications as described above. All such variations are within the scope of the present invention as defined by the claims appended hereto.

In operation, the antenna 42 receives communications from one or more mobile terminals over different channels, including an uplink data channel and an uplink control channel, as described above. After demodulation by the Tx/Rx circuitry 44, the processing circuitry 46 measures an error rate of the received transmissions, for example as described with respect to step 22.

In one embodiment, the processing circuitry 46 further compares the measured error rate with a threshold (as described with respect to step 24), and adjusts the distribution of messages sent over the uplink control channel according to any of the methods described with respect to step 28. For example, the processing circuitry may generate a message signalling an adjustment of the periodicity of CQI reporting, or the periodicity of resources over which scheduling requests may be sent by the mobile terminals. The antenna 42 then transmits the generated message, for example, as an RRC message to the mobile terminals. The processing circuitry 46 may adjust the distribution of resources allocated on the downlink data channel, such that they are more or less time-division multiplexed (thereby adjusting the distribution of ACK/NACK messages).

In another embodiment, the measured error rate may be transmitted to the core network using interface circuitry 48. The core network 10, for example a radio network controller (RNC), may then compare the error rate with a threshold as described with respect to step 24, and determine an appropriate adjustment to the distribution of messages transmitted over the uplink control channel. This adjustment may be signalled back to the radio base station 4, from where it is transmitted to the mobile terminals (in the case of CQI and/or scheduling request adjustment) or used to adapt the distribution of allocated resources on the downlink data channel.

The embodiments of the present invention therefore provide a method and a radio base station which actively monitor the error rate for messages transmitted over an uplink control channel between the radio base station and one or more mobile terminals. The distribution of messages transmitted on the uplink control channel may then be adapted depending on the comparison of the error rate with one or more thresholds.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of controlling resource utilization in a telecommunications network, wherein the telecommunications network comprises a plurality of mobile terminals and at least one radio base station, wherein the mobile terminals are configured to transmit messages to the radio base station over an uplink control channel, and wherein resources for said uplink control channel comprise a plurality of resource blocks, each resource block corresponding to a period of time and a frequency bandwidth, the method comprising:
    measuring an error rate of messages transmitted over the uplink control channel; and
    on the basis of said measured error rate and one or more comparable thresholds, adapting a distribution of messages over said plurality of resource blocks on the uplink control channel by adapting the manner in which resource blocks transmitted by different mobile terminals are multiplexed onto the uplink control channel, wherein said adapting a distribution of messages comprises:
        if the measured error rate is above the one or more thresholds, adapting the distribution of messages such that fewer messages are received over the uplink control channel in a given time interval, thereby reducing the error rate.

2. The method of claim 1, wherein said adapting a distribution of messages comprises adapting the distribution to prefer time-division multiplexing over frequency-division multiplexing such that fewer messages are received over the uplink control channel in a given time interval.

3. The method of claim 1, wherein said adapting a distribution of messages comprises adapting the distribution to prefer time-division multiplexing over code-division multiplexing such that fewer messages are received over the uplink control channel in a given time interval.

4. The method of claim 1, wherein the radio base station is configured to transmit data to the mobile terminals over a data channel, and wherein the messages comprise acknowledgement messages for data transmitted over the data channel.

5. The method of claim 4, wherein resources for transmitting over said data channel comprise a plurality of time intervals, wherein a number of mobile terminals per time interval are scheduled to receive data, and wherein said adapting a distribution of messages comprising increasing or decreasing said number of mobile terminals scheduled per time interval.

6. The method of claim 5, wherein the measured error rate relates to errors on said acknowledgement messages, and wherein the method comprises:
    comparing the error rate to an acknowledgement message error threshold; and
    on the basis of said comparison, adapting the number of messages per resource block over the uplink control channel.

7. The method of claim 1, wherein the messages comprise channel quality reports, wherein said channel quality reports are received periodically, and wherein adapting said distribution of messages comprises increasing or decreasing the period with which each mobile terminal of the plurality of mobile terminals sends said channel quality reports.

8. The method of claim 7, wherein the measured error rate relates to errors on said channel quality reports, and wherein the method comprises:
    comparing the error rate to a channel quality report error threshold; and
    on the basis of said comparison, adapting the distribution of messages per resource block over the uplink control channel.

9. The method of claim 1, wherein the messages comprise scheduling requests, wherein said scheduling requests are allocated one or more of said plurality of resource blocks, and wherein said adapting a distribution of messages comprises increasing or decreasing a number of mobile terminals allocated to each period of time.

10. The method of claim 9, wherein the measured error rate relates to errors on said scheduling requests, and wherein the method comprises:
    comparing the error rate to a scheduling request error threshold; and
    on the basis of said comparison, adapting the distribution of messages per resource block over the uplink control channel.

11. The method of claim 1, wherein said adapting a distribution of messages comprises increasing or decreasing a number of said resource blocks allocated to said uplink control channel.

12. The method of claim 1, wherein said radio base station is configured to transmit a number of data streams to a mobile terminal over a multiple-input, multiple-output (MIMO) radio link, and wherein said adapting a distribution of messages comprises increasing or decreasing said number of data streams.

13. The method of claim 1, wherein the number of received messages is adapted such that, if said measured error rate has a first error rate value, said distribution of messages is a first distribution and, if said measured error rate has a second error rate value, said distribution of messages is a second distribution, the first error rate value being less than the second error rate value, and wherein fewer messages are received in a given time interval in the first distribution than in the second distribution.

14. The method of claim 1 wherein said adapting a distribution of messages further comprises:
    if the measured error rate is below the one or more thresholds, adapting the distribution of messages such that fewer messages are received over the uplink control channel in a given time interval, thereby increasing the error rate.

15. A radio base station for use in a telecommunications network, wherein the telecommunications network comprises the radio base station and a plurality of mobile terminals, wherein the mobile terminals are configured to transmit messages to the radio base station over an uplink control channel, wherein resources for said uplink control channel comprises a plurality of resource blocks, each resource block corresponding to a period of time and a frequency bandwidth, the radio base station comprising:
    a transceiver configured to receive said messages transmitted over the uplink control channel; and
    processing circuitry configured to measure an error rate of said messages and, on the basis of said measured error rate and one or more comparable thresholds, to adapt a distribution of messages over said plurality of resource blocks on the uplink control channel by adapting the manner in which resource blocks transmitted by different mobile terminals are multiplexed onto the uplink control channel, wherein said adapting a distribution of messages comprises:
        if the measured error rate is above the one or more thresholds, adapting the distribution of messages such that fewer messages are received over the uplink control channel in a given time interval, thereby reducing the error rate.

16. The radio base station of claim 15, wherein said processing circuitry is configured to adapt the distribution to prefer time-division multiplexing over frequency-division multiplexing such that fewer messages are received over the uplink control channel in a given time interval.

17. The radio base station of claim 15, wherein said processing circuitry is configured to adapt the distribution to prefer time-division multiplexing over code-division multiplexing such that fewer messages are received over the uplink control channel in a given time interval.

18. The radio base station of claim 15, wherein the transceiver is configured to transmit data to the mobile terminals over a data channel, wherein the messages comprise acknowledgement messages for data transmitted over the data channel, wherein resources for transmitting over said data channel comprise a plurality of time intervals, wherein a number of mobile terminals per time interval are scheduled to receive data, and wherein said processing circuitry is configured to increase or decrease said number of mobile terminals scheduled per time interval.

19. The radio base station of claim 18, wherein the measured error rate relates to errors on said acknowledgement messages, and wherein the processing circuitry is configured to:
    compare the error rate to an acknowledgement message error threshold; and
    on the basis of said comparison, adapt the number of messages per resource block over the uplink control channel.

20. The radio base station of claim 15, wherein the messages comprise channel quality reports, wherein said channel quality reports are received periodically, and wherein said processing circuitry is configured to increase or decrease the period with which each mobile terminal of the plurality of mobile terminals sends said channel quality reports.

21. The radio base station of claim 15, wherein the messages comprise scheduling requests, wherein said scheduling requests are allocated one or more of said plurality of resource blocks, and wherein said processing circuitry is configured to increase or decrease a number of mobile terminals allocated to each period of time.

22. The radio base station of claim 15, wherein said radio base station is configured to transmit a number of data streams to a mobile terminal over a multiple-input, multiple-output (MIMO) radio link, and wherein said processing circuitry is configured to increase or decrease said number of data streams.

23. The radio base station of claim 15, wherein the number of received messages is adapted such that, if said measured error rate is a first error rate value, said distribution of messages is a first distribution and, if said measured error rate has a second error rate value, said distribution of messages is a second distribution, the first error rate value being less than the second error rate value, and wherein fewer messages are received in a given time interval in the first distribution than in the second distribution.

24. The radio base station of claim 15 wherein said adapting a distribution of messages further comprises:
    if the measured error rate is below the one or more thresholds, adapting the distribution of messages such that fewer messages are received over the uplink control channel in a given time interval, thereby increasing the error rate.

* * * * *